United States Patent [19]

Kober

[11] 4,369,201

[45] Jan. 18, 1983

[54] METHOD OF MANUFACTURING REINFORCED FIBERS FOR MINERAL STRUCTURAL MATERIALS, AND A STRUCTURAL ELEMENT OF A FIBER-REINFORCED MINERAL STRUCTURAL MATERIAL

[76] Inventor: Harald Kober, Zur-Nieden-Str. 14, 4690 Herne 2, Fed. Rep. of Germany

[21] Appl. No.: 239,487

[22] Filed: Mar. 2, 1981

[30] Foreign Application Priority Data

Mar. 4, 1980 [DE] Fed. Rep. of Germany ....... 3008204

[51] Int. Cl.³ .................... D06M 13/14; D06M 12/14
[52] U.S. Cl. ......................................... 427/4; 106/99;
106/308 M; 427/212; 427/214; 428/378;
428/540; 428/17
[58] Field of Search ............. 106/99, 308 M; 427/214,
427/212, 4; 428/378, 540, 17

[56] References Cited

U.S. PATENT DOCUMENTS 4,263,049 3/1981 Hansen ................................. 106/99

FOREIGN PATENT DOCUMENTS 259636 10/1926 United Kingdom .................. 106/99

Primary Examiner—Sam Silverberg
Attorney, Agent, or Firm—Michael J. Striker

[57] ABSTRACT

A method of manufacturing reinforcing fibers for a hydraulic binding material, to be used as an initial material for structural elements comprises the steps of providing a plurality of plant fibers and mineralizing the plant fibers. The mineralizing step includes opening the capilaries of the plant fibers, drying the same, impregnating the plant fibers with a lime water suspension, soaking the plant fibers with a formaldehyde-containing water glass solution, and intermediately drying the plant fibers between the impregnating and soaking steps. The plant fibers, after the drying, can be first impregnated with a lime water suspension, then dried, and after this soaked with a formaldehyde-containing water glass solution. It is also possible that the plant fibers, after drying, can be first soaked with a formaldehyde-containing water glass solution, then dried and after this impregnated with a lime water suspension. A structural element has a body of a hydraulic binding material, and a plurality of reinforcing fibers which are formed as mineralized plant fibers.

16 Claims, 3 Drawing Figures

METHOD OF MANUFACTURING REINFORCED FIBERS FOR MINERAL STRUCTURAL MATERIALS, AND A STRUCTURAL ELEMENT OF A FIBER-REINFORCED MINERAL STRUCTURAL MATERIAL

BACKGROUND OF THE INVENTION

The present invention relates to a method of manufacturing reinforcing fibers for mineral materials. It also relates to a structural element composed of a fiber-reinforced mineral structural material.

It is known to manufacture pipes, plates and shapes parts such as roof ridges and angled strips, of a mineral structural material with asbestos fibers admixed to the mineral material to reinforce the latter. It has been known for a long time that the asbestos fibers are health hazardous and their utilization necessarily requires the provision of safety measures. Despite this no reinforcing fibers for mineral structural materials as initial materials for structural elements could be found with the physical characteristics as advantageous as the asbestos fibers have, and at the same time which could be not healthy hazardous and thereby would be less expensive.

Some experiments were conducted with metallic fibers. The metallic fibers are, however, too coarse and rigid to be worked without difficulty, and they have a strong tendency to make deposits in water suspensions. Experiments with glass fibers have shown that they have low dispersing characteristics in a water suspension and readily form stoppers which deposit and drain off too fast to make possible machine working. The glass fibers are also expensive. Furthermore, synthetic polyester or acetate base fibers and the like have also been tested with respect to their use for replacing asbestos. These fibers are, however, difficult to disperse, they often form strands in mixing devices, and are not sufficiently hydrophilous. Experiments with wood fibers have shown that they require additional chemical treatment and are difficult to work, since wood lignine and sugar undesirably affect the product strength. Attempts to utilize untreated, that is raw natural fibers, have not been performed, because of the danger of fire, their susceptibility to rot, and the high water absorption.

In addition to the above-mentioned disadvantages of the asbestos, it also has a tendency to form bundles and clusters, because of its structure. This makes difficult the formation of a homogeneous mixture of the asbestos concrete. Approximately 15% of the asbestos component is found to be bundled so as to form so-called nests in the mixture. Because of this it is not, for example, excluded that under the action of weather the nests in the concrete are released and the asbestos is carried away be wind.

Finally, the price of the asbestos should also not be underestimated during all considerations about the efficiency of the asbestos. Asbestos must be imported, which is connected with increase of production costs.

SUMMARY OF THE INVENTION

Accordingly, it is an object of the present invention to provide a method of manufacturing of reinforcing fibers for mineral structural material as an initial material for structural elements, and a structural element composed of mineral structural material with reinforced fibers, which make it possible to replace the conventionally utilized and health hazardous asbestos fibers and at the same time to attain the advantageous physical characteristics of the asbestos fibers.

In keeping with these objects, and with others which will become apparent hereinafter, one feature of the present invention resides in a method of manufacturing reinforcing fibers for a hydraulic binding material, to be used as an initial material for structural elements such as pipes, plates and other shaped elements, in accordance with which a plurality of plant fibers are provided, and the plant fibers are mineralized. More particularly, the capillaries of the plant fibers are opened, the plant fibers are dried, the plant fibers are impregnated with a lime water suspension, the plant fibers are soaked with a formaldehyde-containing water glass solution, and the plant fibers are intermediately dried between the impregnating and soaking steps. It is possible that after the drying step, the plant fibers are impregnated with a lime water suspension, then they are intermediately dried, and after this the lime-containing fibers are soaked with the formaldehyde-containing water glass solution.

It is also possible to perform the soaking step first, that is after the drying step; in other words, the plant fibers are soaked with a formaldehyde-containing water glass solution, then they are immediately dried, and then the soaked plant fibers are impregnated with the lime water suspension.

When the method is performed in accordance with the applicant's invention, the reaction ability of lime and silicic acid as component of water glass is utilized to mineralize plant fibers which have capillaries. The thus produced fibers possess the advantageous physical characteristics of the asbestos fibers in the sense of their accessibility and their resistance to industrial gases, fungal attack, insect action, rotting and decomposition, as well as even greater non-inflammability than asbestos. Moreover, such fibers can be used within the framework of the known methods, such as for example drum sieve, endless sieve dispersion, extrusion, and cast processes. As compared with asbestos, the fibers in accordance with the present invention do not have health hazardous properties. The reinforced fibers in accordance with the present invention have the bending strength and the shearing strength of water glass, and the tension strength of plant fibers. A further advantage of the inventive reinforced fibers is that the raw fibers are products of natural agriculture, which are not only higher than asbestos and thereby better to transport, but also do not require import expenditures.

Experiments have shown that the structural elements composed of mineral structural material reinforced with mineralized plant fibers have the bending strength in directions transverse and parallel to the fibers which is at least 30% higher than the respective structural elements reinforced with asbestos fibers. The reinforcing fibers in accordance with the present invention can be utilized with any desirable length, and provide for a great clamping length. They do not have the tendency to form bundles and clusters. The tearing strength of the inventive reinforcing fibers are equal to at least double of the tearing strength of asbestos.

Experiments have shown that the structural elements with the reinforcing fibers in accordance with the present invention do not show the blooming which often takes place in asbestos cement structural elements. Furthermore, the bursting of paint and decorative coatings is reliably prevented. Finally, the reinforcing fiber has a more favorable price per unit volume than asbestos.

The inventive reinforcing plant fibers are advantageously stalk fibers. Flax fibers are especially advantageous for this purpose. In connection with particular hydraulic binding materials, such as for example cement or gypsum, or also in connection with synthetic resin structural material, such reinforcing fibers possess all advantages of asbestos cement production, and at the same time do not have the disadvantages of the latter.

In addition to flax fibers, also other plant fibers can be utilized such as fibers or jute, hemp, coco, sissal, kapoc, ramie or manilla.

The utilization of these fibers depends on the quality and the functions of the required final product.

For manufacturing the reinforcing fibers in accordance with the present invention it is first necessary to make the raw plant fibers available for further mineralizing with the aid of respective treatment. The drying step performed after the separation must bring the residual moisture as close as possible to zero, in order to reduce to a minimum the time of subsequent soaking. Moreover, in this case greater hollow space is provided for admitting the mineralizing material and a uniform initial condition for all batches, whereby a uniform and better predictable composition of the final product can be guaranteed.

After the drying of the raw fibers, they are either impregnated with a suspension of advantageously lime and water (lime milk) and after a further intermediate drying soaked with a formaldehyde-containing water glass solution, or they are first soaked with the formaldehyde solution and then after intermediate drying impregnated with the lime milk.

In connection with this it is important that under the action of the silicic acid contained in the water glass, the lime hydrate transforms into calcium silicate which provides for a homogeneous filling of the capillaries of the plant fibers as well as coating of the cell walls. The crystalline filling penetrates through the fissured walls of the fibers and bindswith the crystalline outer coating of the fibers or fiber bundle, whereby after mixing with the binding material the fibers are inwardly clamped therein over their entire surface. It is advantageous to add such amount of the solution of water glass as to provide a sufficient surplus for binding the lime hydrate which is liberated during silification taking place later in the finished fiber concrete product. The complete clamping of the entire inner and outer surfaces of the fibers with the surrounding binding material provides for a total encapsulation of the organic component of the structural elements. Thereby the natural elongation of the plant fibers cannot act any longer in disadvantageous manner.

When the dried raw fibers are first impregnated with lime milk, the lime milk fills the hollow space in the fibers or fiber bundles. During the subsequent drying, the lime rigidifies in connection with the mixing water to calcium hydroxide. This condition leads first to only a low strength. During the connection with the silicic acid mineral rods assume relatively high pulling strength and bending strength.

When the reinforcing fibers are manufactured by first soaking with the water glass formaldehyde solution and, after the intermediate drying, impregnation with the lime solution, the reinforcing fibers manufactured with this sequence of steps possess the same advantages as the reinforcing fibers manufactured with the first-mentioned sequence of steps.

The treatment of the fibers with the formaldehyde-containing water glass solution can be performed by dipping, sprinkling or spraying. In connection with this, it is advantageous when the formaldehyde-containing water glass solution has a degree of dilution of substantially between 10 and 20% of calcium silicate or sodium silicate.

In accordance with another advantageous feature of the present invention, the plant fibers, after the soaking with the formaldehyde-containing water glass solution or the impregnation with the lime milk, are subjected to final drying or directly treated with the mineral structural material. The final drying served for imparting a storing stability to the reinforcing fibers. When the treated fibers are not to be taken and placed for storage, the production machine can be provided with impregnating or soaking devices. After sufficient draining time, the treated fibers can be provided with a mineral structural material.

It has been shown by experiment that the treatment of the raw fibers can also be performed with a mixture which contains all components of the method, that is, lime, water, silicic acid and formaldehyde. Such a mixture solution can be used, however, only during a relatively short time, inasmuch as lime and silicic acid react with one another. The process sequence must be such that only small batches can be prepared and must be continuously controlled, inasmuch as the suitability depending on the temperature, the aging of the mixture (pot time), and the aging of the components (storing time), can make the formation of a mineral aggregate impossible. In this case flake-shaped dust particles fall out.

Such a method will also be susceptible to troubles, involve time losses, and be risky because of its incalculability. Moreover, it would be not economical because of constant changes of bath. The time limits in which the suitability of such a mixture must be proven are not fixed, because the basic condition continuously changed. Important influential parameters are, for example, changing surrounding temperatures, heating of the bath by reaction heat, fresh water supply, aging of the individual components, as well as constantly changing pH value during the pot time, and the increasing water hardening.

Instead of the lime milk, also cement milk can be used in some cases. Problematic in the event of the cement milk is, however, the length of the ripeness time and strong shrinkage under the action of premature fast drying. With prolonged moisturing, bending of the cement particles is no longer possible. Also, in the event of direction of introduction of the bath moistened fibers, a gel shrinkage takes place. It is questionable that the sufficient clamping with the outer surface of the plant fibers can be guaranteed.

The ability of the plant fibers to suck the mineralizing material to a certain extent is improved in accordance with the present invention when the plant fibers are completely released from wooden particles before opening of the capillaries. For this purpose the fibers can be treated in a respective manner, for example similar to the methods utilized for manufacturing linens. The bleaching, however, does not take place. Instead of this, the fibers after hackling are scalded and squeezed, in order to liberate them from all wood residues showings, dried chlorophyll, marrow and other impurities. Moreover, it is provided because of the opening of the capillaries that the formaldehyde is not sucked through the respective components, but can flow with the excessive water in direction toward the cell walls. During this travelling of the water, the formaldehyde is filtered out by the cell walls. Thereby, the organic components are resistant against rotting, fungal attack, insect action and agressive atmosphere; in other words, they can be preserved for a long time.

In accordance with still another advantageous feature of the present invention, the plant fibers are cut to a length of substantially between 4 and 25 mm. This guarantees that the capillaries are open at both ends of the fibers so that a seamless transition from the mineral filling the fibers to the coating binding material is attained.

It is also important in accordance with the present invention that the soaked and/or impregnated fibers during the intermediate drying and the final drying are continuously moved and loosened. The continuous movement and loosening is important to prevent formation of stone-like lumps which subsequently must be broken so that the rods inside the capillaries are undoubtedly destroyed.

The drying process, that is the reaction of the water glass, the removal of the excessive water and the separation of the individual fibers, is positively performed in accordance with the present invention when the fibers are dried in a whirl layer of a heating apparatus, such as a tank, a tunnel and the like. The temperature of the drying step is approximately 300° C. During subsequent cooling, the fiber capillaries shrink and envelop the mineral rods even narrower.

In accordance with a further feature of the present invention, the raw fibers must be dried in the most cases so as to have a residual moisture of less than 10%. In connection with this, it is advantageous when for the fibers having a residual moisture of approximately 8%, the time of soaking with the formaldehyde-containing water glass solution is equal to approximately 10–12 minutes. When the fibers have a residual moisture of approximately 2% and lower, it is sufficient to provide soaking time of approximately 2–4 minutes.

Because of always different water hardening, it is impossible to do without the preliminary laboratory tests. Morever, temperature and pressure also influence the treatment time. When vacuum tank is utilized, the intended results are improved.

The present invention also deals with a structural element formed as a pipe, a plate or other shaped parts, which are composed of a structural material including a fiber-reinforced hydraulic binding medium such as for example cement or gypsum, wherein in accordance with the invention the reinforcing fibers are mineralized plant fibers. The mineralization of the plant fibers provides not only for reinforcement of the plant fibers and eliminates their extensibility, but also clamps the organic components with the inorganic components of the structural material so that the reinforcing fibers also possess high tearing strength.

Advantageously, the capillaries and the cell walls of the plant fibers are coated with calcium silicate.

It is important for the inventive structural element, that the plant fibers are formed of stalk fibers, advantageously of flax fibers.

For normal wall coating or roof coating, the fibers have a weight equal to approximately 5% of the total mixture weight.

The weight of the fibers can, naturally be, increased in dependence upon the particular requirements, for example for self-supporting cover elements, stairs or building linings, which are subjected to high wind and snow loading. In this case, the weight of the mineralized plant fibers does not exceed approximately 12% of the mixture weight.

The novel features which are considered characteristic for the invention are set forth in particular in the appended claims. The invention itself, however, both as to its construction and its method of operation, together with additional objects and advantages thereof, will best be understood from the following description of preferred embodiments when read in connection with the accompanying drawing.

Figure 1:
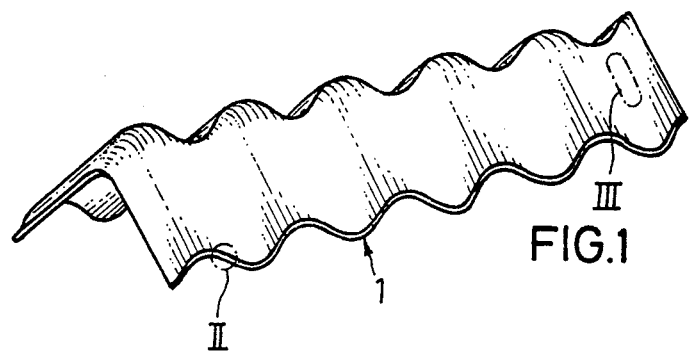
FIG. 1 is a perspective view of a structural element in accordance with the present invention.

A structural element 1 in accordance with the present invention is profiled and has an angular cross section as can be seen from FIG. 1. It can be utilized, for example, as a ridge cap. Instead of such an angularly profiled structural element 1, also plate-shaped, pipe-shaped and other profiled structural elements can be provided.

Figure 2:
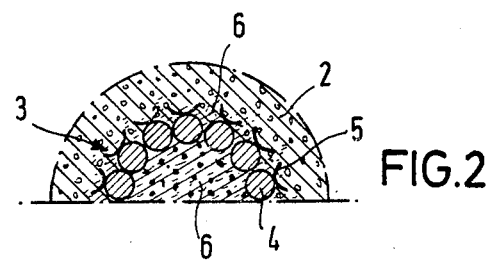
FIG. 2 is an enlarged view showing a transverse section of the inventive structural element taken in the region II of the embedded reinforcing fibers.
Figure 3:
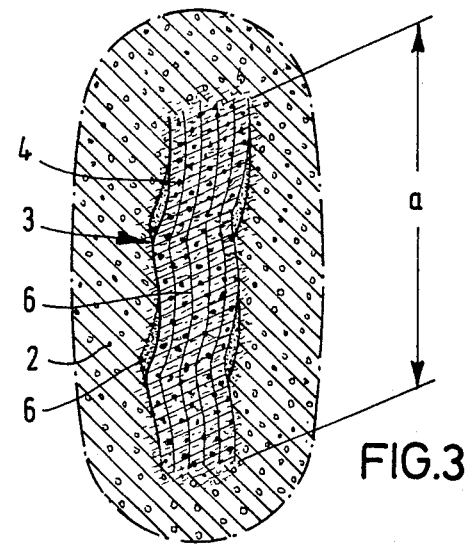
FIG. 3 is an enlarged view showing a longitudinal section of the structural element in accordance with the present invention, taken in region III of the embedded reinforcing fibers.

The structural element 1 is composed of a fiber-reinforced mineral structural material. As can be seen from FIGS. 2 and 3, the structural material consists of a hydraulic binding medium 2, for example cement, and of mineralized plant fibers 3 composed of individual cellulose fibers 4. The torn fiber rin which is illustrated only schematically, is identified by reference numeral 5. The structural element in accordance with the present invention is manufactured in the following manner:

First, the plant fibers, for example flax fibers, are treated by hackling, scalding, and squeezing until they are released advantageously from all wood residues (shavings), dried chlorophyll, marrow and other impurities. Thereby the hollow spaces, that is the capillaries in the flax fibers, are opened.

The raw fibers with the thus opened capillaries are then dried. A hollow space which is sufficient in the raw fibers for their subsequent treatment is attained when the residual moisture is equal to 8% and lower.

The dried raw fibers are now impregnated with a lime solution. The impregnation can be performed by dipping. Thereby the hollow spaces in the fibers 3 are filled with the solution. During the subsequent intermediate drying of the fibers 3, which is advantageously performed in a whirl layer of a hot-air tank, the lime hydrate hardens and the water evaporates.

Then the lime-containing fibers 3 are soaked with a formaldehyde-containing water glass solution. The soaking can be performed, for example, in an immersion bath. Because of the silicic acid available in the water glass, the lime hydrate transforms into calcium silicate 6 which fills all capillaries and hollow spaces of the fibers 3 and also penetrates during the treatment through the fissured cell walls 5. Thereby, the calcium silicate 6 also coats the cell walls 5.

After the soaking with the water glass formaldehyde solution, the fibers 3 are again dried, which can also be performed in a whirl layer of a hot air tank.

During this drying, the water travels because of evaporation and under the action of osmosis, through the capillaries and the cell walls 5 outwardly. Thereby the formaldehyde is filtered out on the cell walls 5 and they are preserved for a long time.

The thus dried mineralized plant fibers 3 can be mixed with a hydraulic binding material, such as cement 2. With a respective surplus of water glass, the latter binds lime hydrate which liberates during the cement silification. The individual plant fibers 3 are embedded in the binding material 2 as can be seen from FIGS. 2 and 3. There is provided here a homogeneous connection of the calcium silicate 6, which fills the capillaries and coats the cell walls, with the hydraulic binding material 2. The length a of the fibers 3 is equal to approximately 4–25 mm.

The thus produced structural material which is composed of the mineralized plant fibers 3 and the hydraulic binding material 2, can be worked with the aid of drum sieve, endless sieve, dispersion, extrusion and cast processes so as to form plates, pipes and other shaped parts, such as for example the angularly profiled structural element shown in FIG. 1.

It will be understood that each of the elements described above, or two or more together, may also find a useful application in other types of constructions differing from the types described above.

While the invention has been illustrated and described as embodied in a method of manufacturing of a fiber-reinforced structural material and a structural element composed of the latter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of manufacturing reinforcing fibers for a hydraulic binding material, to be used as an initial material for structural elements such as pipes, plates and the like, the method comprising the steps of providing a plurality of plant fibers having capillaries; and mineralizing the plant fibers by opening the capillaries of the plat fibers, drying the plant fibers, impregnating the plant fibers with a lime water suspension, soaking the plant fibers with a formaldehyde-containing water glass solution, and intermediately drying the plant fibers between said impregnating and soaking steps.

2. A method as defined in claim 1, wherein said impregnating step is performed after said drying step, said intermediate drying step being performed after said impregnating step so that the plant fibers impregnated with the water lime suspension are dried, and said soaking step being performed after said intermediately drying step so that the lime-containing fibers are soaked with the formaldehyde-containing water glass solution.

3. A method as defined in claim 1, wherein said soaking step is performed after said drying step, said intermediately drying step being performed after said soaking step so that the plant fibers soaked with the formaldehyde-containing water glass solution are dried, and said impregnating step being performed after said intermediately drying step so that the soaked plant fibers are impregnated with the lime water suspension.

4. A method as defined in claim 1, wherein said providing step includes cutting the plant fibers to a predetermined length.

5. A method as defined in claim 1, wherein said providing step includes providing flax fibers.

6. A method as defined in claim 1, wherein said soaking step includes soaking with the formaldehyde-containing water glass solution with a degree of dilution of substantially between 10% and 20% of a silicate selected from the group consisting of a calcium silicate and sodium silicate.

7. A method as defined in claim 1; and further comprising the step of final drying of the plant fibers, after a respective one of said soaking and impregnating steps.

8. A method as defined in claim 1; and further comprising the step of final treating the plant fibers with a mineral material, after a respective one of said soaking and impregnating steps.

9. A method as defined in claim 1; and further comprising the step of substantially completely removing wooden particles from the plant fibers, before said opening step.

10. A method as defined in claim 1, wherein said opening step includes hackling, scalding and squeezing the plant fibers with subsequently drying thereof.

11. A method as defined in claim 4, wherein said cutting step includes cutting the plant fibers to a length of substantially between 4 and 25 mm.

12. A method as defined in claim 5, wherein said drying step and said final drying step includes continuously moving and loosening the plant fibers, after a respective one of said soaking and impregnating steps.

13. A method as defined in claim 12, wherein said drying step and said final drying step include drying the plant fibers in a whirling layer of a hot air apparatus.

14. A method as defined in claim 1, wherein said providing step includes preliminarily drying the plant fibers to a residual moisture of not more than substantially 10%.

15. A method as defined in claim 14, wherein said preliminary drying step includes preliminarily drying the plant fibers to a residual moisture of substantially 8%, said soaking step including soaking during substantially between 10 and 12 minutes.

16. A method as defined in claim 14, wherein said preliminarily drying step includes drying to a residual moisture of substantially 2%, said soaking step including soaking during substantially between 2 and 4 minutes.

* * * * *